(No Model.)

E. H. SPENCER.
CULTIVATOR.

No. 397,253. Patented Feb. 5, 1889.

Witnesses,
Thos. Houghton.
Henry B. Munn

Elijah H. Spencer,
Inventor,

Freeman & Money,
Attorneys.

United States Patent Office.

ELIJAH H. SPENCER, OF WINONA, MISSISSIPPI.

CULTIVATOR.

SPECIFICATION forming part of Letters Patent No. 397,253, dated February 5, 1889.

Application filed October 30, 1888. Serial No. 289,521. (No model.)

*To all whom it may concern:*

Be it known that I, ELIJAH H. SPENCER, a citizen of the United States, residing at Winona, in the county of Montgomery and State of Mississippi, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
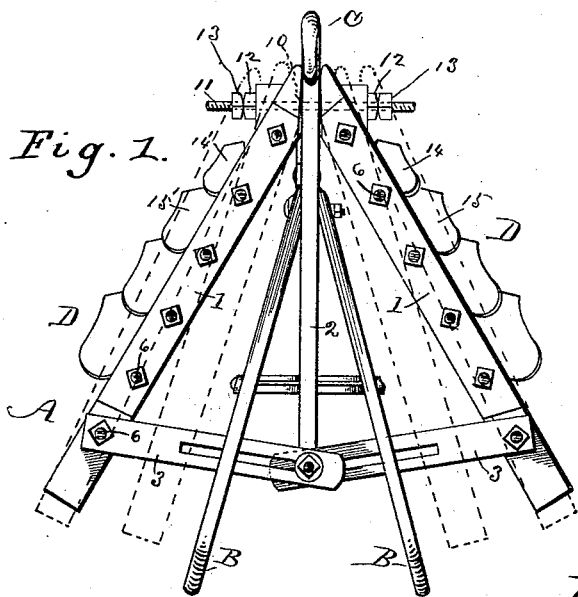
Figure 3:
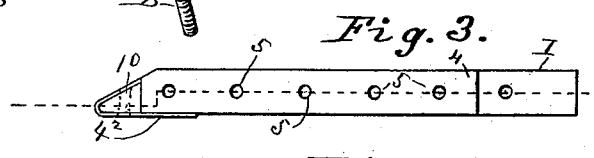
Figure 4:
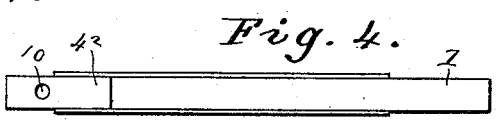
Figure 5:
Figure 2:
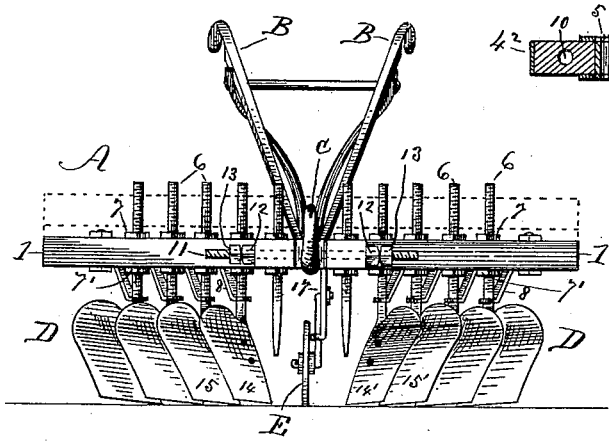

Figure 1 is a top or plan view of a cultivator embodying my invention. Fig. 2 is a front elevation of the same. Figs. 3, 4, and 5 are detail views of one side beam of the frame.

The objects of my invention are to provide a cultivator-frame that may be adjustable in width at its front end as well as in the rear of the same; also, to combine a series of plows, shovels, or other cultivator implements of gradually-increased size from the front to the rear of the cultivator-frame.

My improved cultivator consists of a frame, A, provided with handles B, a hook or clevis, C, plows D, and a front wheel, E.

The frame A consists of two side beams, 1 1, a central beam, 2, and adjustable rear bars, 3 3. Side beams, 1 1, are usually constructed of hard wood and shod with iron straps or plates 4 4′ 4². A row of holes, 5 5, are run through said side beams, 1, for the insertion of the plow or cultivator standards 6. Said standards are screw-threaded from their top ends down nearly to the top of the plows, and are provided with two nuts, 7 7′, adapted to secure the frame at any height from the ground, so as not to interfere with the growing plants while cultivating them. Each plow-standard is provided with an iron brace, 8, in the usual well-known manner. The front end of the cultivator-beams 1 1 and the central beam, 2, are perforated, as at 10 in dotted line in Figs. 1 and 3 and at 10 in full line in Figs. 4 and 5, to receive a bolt, 11, screw-threaded its entire length and provided with adjusting and lock nuts 12 13, so that the front end of the cultivator may be widened or narrowed, as shown by dotted lines in Fig. 1. The rear end of the cultivator may also be adjusted in width, as shown in dotted lines in Fig. 1.

It will be observed that I construct my cultivator-plows in a novel manner. The first or front pair of plows, 14 14′, are small plows, the next pair, 15 15′, are larger, and each succeeding pair are of larger size. The object of this is to throw the earth more evenly against the rows of plants than has hitherto been done. At the front end of the cultivator I provide a wheel, E, which is supported on a hanger, 17, secured to the central beam, 2, of the frame. Said wheel E serves for a pivotal bearing when turning the cultivator at the end of a row.

I do not claim, broadly, an adjustable cultivator-frame; but what I wish to secure by Letters Patent is—

1. In a cultivator-frame provided with side beams, 1 1, and central draft-beam, 2, the combination of front wheel, E, adjustable slotted rear connecting-bars, 3 3, and a series of plows or cultivator-teeth properly secured in said side beams and of gradually-increased size from the front ends to the rear of said beams, all as herein shown and described.

2. A cultivator provided with a series of plows or cultivator-teeth of gradually-increased size from the front to the rear of the same, as herein shown and set forth.

In testimony whereof I affix my signature in presence of two witnesses.

ELIJAH H. SPENCER.

Witnesses:
A. J. PYRON,
J. H. REEVES.